3,756,833
FOOD COMPOSITION CONTAINING GARLIC POWDER, PAPRIKA AND BLACK PEPPER AND METHOD OF USING SAME

Louis A. Powell, Winter Haven, Fla., assignor to Wellman-Power Gas Incorporated, Lakeland, Fla.
No Drawing. Continuation-in-part of application Ser. No. 26,124, Apr. 6, 1970. This application Aug. 13, 1971, Ser. No. 171,722
Int. Cl. A23l 1/22, 1/26
U.S. Cl. 99—140 R                                9 Claims

ABSTRACT OF THE DISCLOSURE

A base food composition consisting essentially of garlic powder and paprika is provided. It can be blended with seasoning ingredients, e.g., onion powder and salt; sealants, e.g., black pepper; and flavor enhancers, e.g., MSG, to provide a seasoning composition which can be used in a process for cooking food products, e.g., meat, fowl or fish.

---

This application is a continuation-in-part of application Ser. No. 26,124, filed Apr. 6, 1970, now abandoned.

This invention relates to food products and to their preparation, and more particularly to food seasoning compositions and to certain base compositions useful in their preparation.

There are a number of seasonings that are prepared for a specific item, such as steak, chicken, seafood, etc. They are made up of spices and herbs, thereby limiting their use. They are very tasty with steak, or roast beef, but not as tasty with seafood or chicken.

There has long been a need for a seasoning that would be very good on meat, poultry, or seafood without the strange taste of an herb that the average person does not know anything about. An object of the present invention is to provide this kind of seasoning. It is also an object to provide a seasoning which does not necessarily employ herbs and is made to suit the average American taste buds. The used herbs tend to leave a strange taste in one's mouth.

Another object is to provide food products having "eye appeal," i.e., food cooked with the seasoning will have color in cooking as distinguished from a dull look. It is a further object to provide a food seasoning product which not only seasons and colors food, but helps to seal in the natural juices of foods, e.g., meats such as steaks and roasts; fowl, e.g., poultry; and fish, e.g., seafood, when such foods are broiled, fried, or roasted. It is also an object to provide a food seasoning product which can make a very tasty sauce for seafood by just adding it to chili sauce or catsup, and which is also very good when added to pan fried or hash brown potatoes.

It is a further object to provide a seasoning that penetrates a food product when cooking to provide a uniform taste throughout the product. Another object is to provide a seasoning which will adhere to a food product being cooked and thus obviate or reduce the usual repeated application of seasoning normally required to provide an appropriately seasoned and cooked product. Other objects of the invention will be apparent from the following disclosure.

In accordance with the present invention, the seasoning employs a novel base composition which consists essentially of garlic powder and paprika in amounts of each sufficient to provide an emulsifying combination and these amounts will generally range from about 10 to 28 weight percent, preferably about 14 to 22 weight percent, of garlic powder and the balance being paprika, e.g., about 72 to 90 weight percent, preferably about 78 to 86 weight percent based on the total paprika and garlic powder. The minimum amount of the combination employed in seasoning compositions is advantageously about one and one-half (1½) ounces per 40 ounces of the seasoning.

The base composition can be advantageously employed with seasoning ingredients, preferably a combination of onion powder and sodium chloride (salt) in seasoning amounts of each. Generally the onion powder is incorporated in amounts from about 15 to 55 weight percent, preferably from about 25 to 45 weight percent based upon the total weight of the onion powder, garlic powder and paprika. Generally the salt is incorporated in amounts from about 84 to 95 weight percent, preferably from about 88 to 92 weight percent based upon the total weight of the salt, garlic powder and paprika.

In another embodiment of the present invention, the base composition is advantageously employed with a juice sealant to substantially seal the natural juices and flavors of a food product in the product while the product is being cooked. The sealant, preferably black pepper, is employed in juice sealing amounts and these amounts generally range from about 33 to 55 weight percent, preferably from about 38 to 50 weight percent based on the total weight of the black pepper, garlic powder and paprika.

Other additives can be employed, particularly flavor enhancers, preferably monosodium glutamate (MSG) which is advantageously employed in flavor enhancing amounts, generally from about 70 to 90 weight percent or more, preferably from about 75 to 85 weight percent based upon the total weight of the MSG, garlic powder and paprika.

A particularly advantageous seasoning composition provided by the present invention is one including the garlic powder and paprika as the base composition in combination with onion powder and salt as seasoning ingredients, black pepper as a sealant and MSG as a flavor enhancer. The seasoning components can be mixed together in amounts set forth supra, for instance in the amounts set forth for the garlic powder and paprika base composition and the amounts for each of the other ingredients set forth for the given ingredient in relation to this base composition. The mixing can be accomplished by dry blending all of the ingredients in a Hobart type mixer. The seasoning composition can be applied to food products, for instance before the cooking of the product is begun, preferably by sprinkling an amount of it sufficient to form a substantially continuous layer of the seasoning around the product. The product can also be advantageously coated with a fatty material, e.g., oleomargarine, before the seasoning is applied.

The following examples will serve to illustrate the present invention but are not to be considered limiting.

EXAMPLE I

A dry base composition is prepared by dry blending 2.5 ounces of paprika (a condiment made from the ripe fruit of a mild variety of red pepper known as *Gapsicum fruiescens* and 0.5 ounce of garlic powder (fresh bulb of *Allium sativum* L.).

EXAMPLE II

The dry base composition of Example I is dry blended with 2.0 ounces of onion powder (made from the edible succulent bulb of an herb, *Allium cepa,* of the Lily family) and 24.0 ounces of sodium chloride to provide a base composition containing seasoning ingredients.

EXAMPLE III

The dry base composition of Example I is dry blended with 2.5 ounces of black pepper (a pungent aromatic condiment consisting of ground dried immature berries of a plant, *Piper nigrum*) to provide a base composition containing a sealant.

EXAMPLE IV

The dry base composition of Example I is dry blended with 12.0 ounces of MSG to provide a base composition containing a flavor enhancer.

EXAMPLE V

The base composition of Example I is dry blended with 2.0 ounces of onion powder, 24.0 ounces of sodium chloride, 2.5 ounces of black pepper, and 12.0 ounces of MSG to provide a seasoning composition.

EXAMPLE VI

A seasoning composition is prepared by dry blending 26.0 ounces of salt, 8.0 ounces of MSG, 2.0 ounces of black pepper, 2.0 ounces of paprika, 1.5 ounces of onion powder and 0.5 ounce of garlic powder.

EXAMPLE VII

Two steaks weighing twelve ounces each were cut from a boneless strip sirloin (side by side). One steak was seasoned with the seasoning of Example VI and one steak was not seasoned. They were broiled in a gas broiler side by side until cooked to medium. Both were taken out of the broiler at the same time and placed on scales. The unseasoned steak weighed eight and three quarter ounces, a loss of three and one quarter ounces in cooking. The seasoned steak weighed eleven ounces even, a loss of only one ounce in cooking, and a difference of two and one quarter ounces more in weight than the steak which was not seasoned.

EXAMPLE VIII

Two hamburgers were taken from the same grind of of chuck beef, both weighing three ounces. One was seasoned with the seasoning of Example VI and one was not seasoned. The two hamburgers were then cooked on a grill until done. The unseasoned hamburger weighed one and three quarter ounces after cooking. The seasoned hamburger weighed two and three quarter ounces, a difference of one ounce more than the unseasoned hamburger.

EXAMPLE IX

Two chicken halves, each weighing sixteen ounces were used. One was seasoned with the seasoning of Example VI and one was not. Both were placed in a gas broiler and broiled (side by side) until done. The unseasoned chicken weighed ten and one-half ounces after cooking. The seasoned chicken weighed fourteen and one-half ounces, a difference of four ounces more than the unseasoned chicken.

EXAMPLE X

Two cuts of red snapper, cut side by side, and weighing eight ounces each were used. One was seasoned with the seasoning of Example VI and one was not. Both were broiled side by side in a gas broiler until done. The unseasoned cut weighed five ounces after cooking. The seasoned cut weighed seven and one quarter ounces after cooking, a difference of two and one quarter ounces more than the unseasoned snapper.

All of the above examples that were seasoned also had a desirable golden brown color and the seasoning did penetrate so that the fine taste was in the center as well as the outside.

It is claimed:

1. A base food composition consisting essentially of about 10 to 28 weight percent of garlic powder, about 72 to 90 weight percent paprika based on the weight of garlic power and paprika, and about 33 to 55 weight percent of black pepper based on the weight of the black pepper, garlic powder and paprika.

2. The composition of claim 1 including from about 70 to 90 weight percent monosodium glutamate (MSG) based upon the weight of the MSG, garlic powder and paprika.

3. The composition of claim 1 including from about 15 to 55 weight percent onion powder based upon the weight of the onion powder, garlic powder and paprika, and from about 84 to 95 weight percent sodium chloride based upon the weight of the sodium chloride, garlic powder and paprika.

4. The composition of claim 3 including from about 70 to 90 weight percent MSG based upon the weight of the MSG, garlic powder and paprika.

5. A process for seasoning cooked food products comprising substantially coating the food product with the composition of claim 4 before the food product is completely cooked.

6. The process of claim 5 wherein the food product is meat, fowl or fish.

7. The process of claim 5 wherein the food product is coated with oleomargarine before the food product is coated with the composition.

8. The process of claim 7 wherein the food product is coated with the composition before the product is cooked.

9. A base food composition consisting essentially of about 14 to 22 weight percent of garlic powder, about 78 to 86 weight percent paprika based on the weight of garlic powder and paprika, and about 38 to 50 weight percent black pepper based on the weight of the black pepper, garlic powder and paprika.

References Cited

UNITED STATES PATENTS 3,078,172    2/1963    Libby _____ 99—192

OTHER REFERENCES

Merory: Food Flavorings, 2nd ed., A.V.I. Publishing Co. Inc., Westport, Conn. (1968), p. 271.

Heath: "The Right Way To Use Herbs & Spices," Food Mfg., vol. 41 (1966), pp. 20, 23 and 24.

"Good Housekeeping Cookbook," Rinehart & Co., Inc., New York, N.Y. (1949), pp. 225–256.

JOSEPH SCOVRONEK, Primary Examiner

S. MARANTZ, Assistant Examiner

U.S. Cl. X.R.

99—107, 143